INVENTORS
ARCHIE J. McMASTER
ANDREW CHRISTY
BY
Mueller & McLaughlin
ATTORNEYS

INVENTORS
ARCHIE J. McMASTER
ANDREW CHRISTY
BY
Mueller & McLaughlin
ATTORNEYS

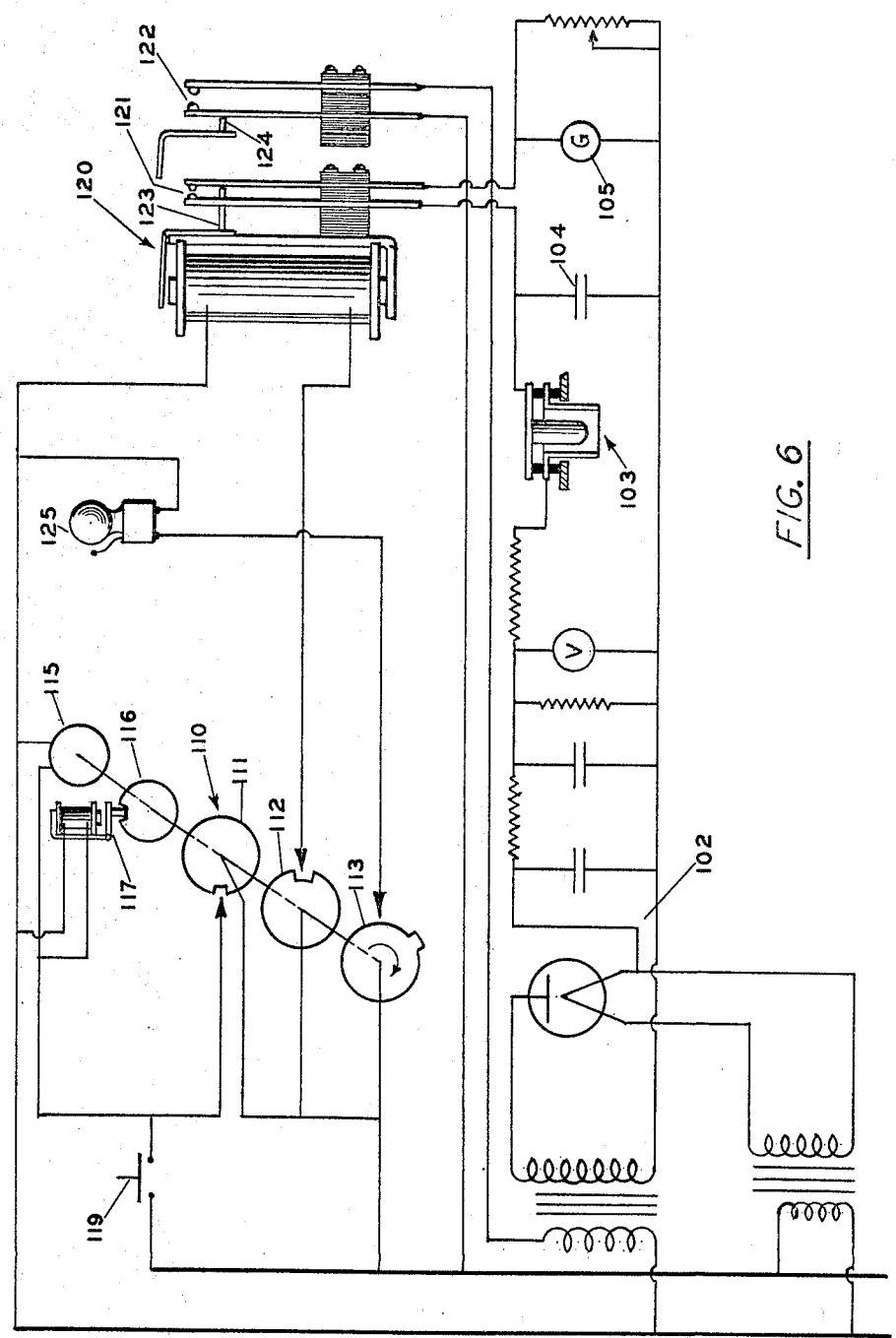

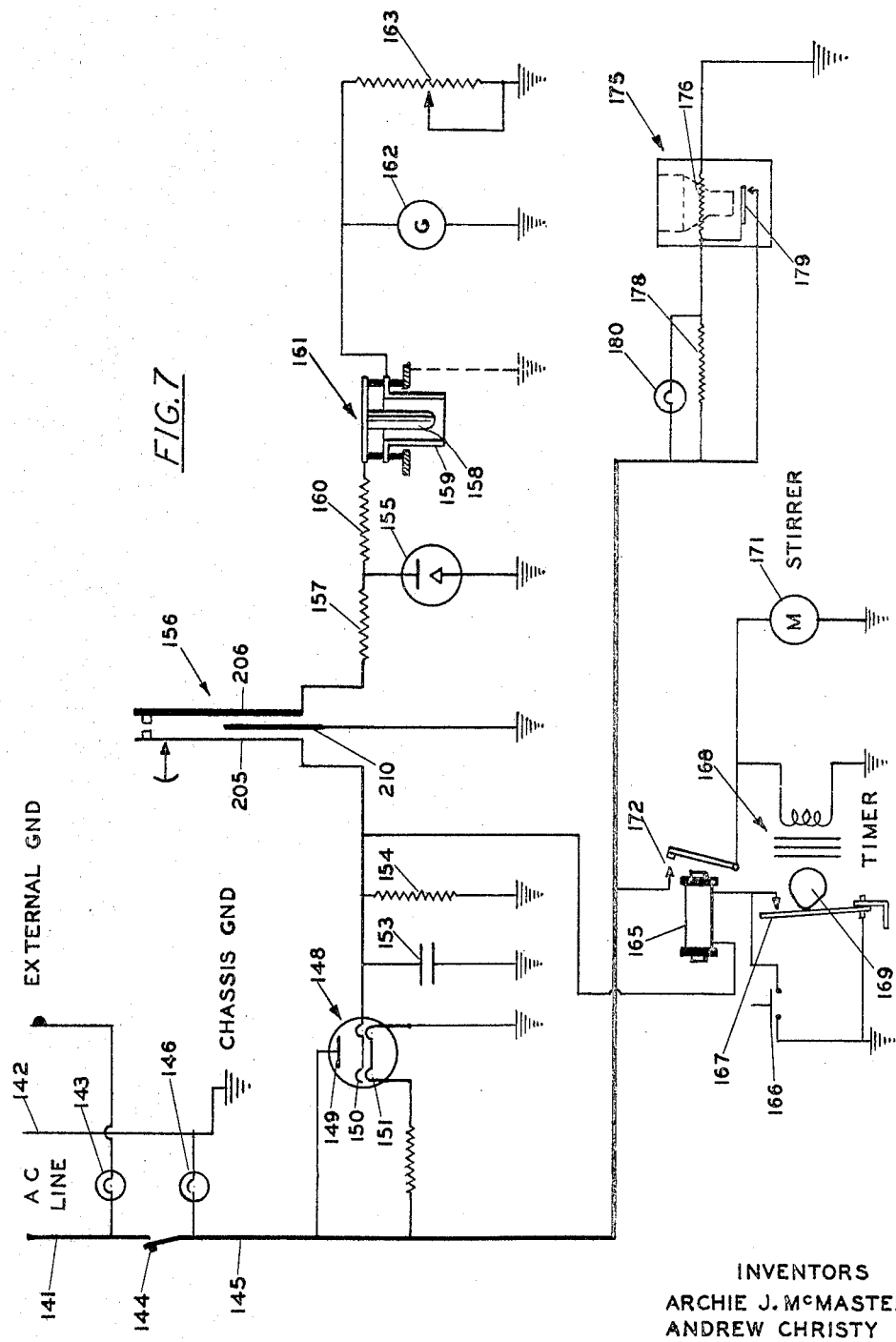

Patented July 5, 1938

2,122,578

UNITED STATES PATENT OFFICE 2,122,578

TESTING OF LUBRICANTS

Archie J. McMaster, Highland Park, and Andrew Christy, Chicago, Ill., assignors to G-M Laboratories, Inc., Chicago, Ill., a corporation of Illinois Application November 27, 1933, Serial No. 699,872

15 Claims. (Cl. 175—183)

The present invention relates generally to the testing of lubricants and more particularly to the testing of used oils and greases to determine their state of depreciation.

It has long been assumed, and without doubt, the assumption has generally been correct, that the lubricating oil in the crank case of an internal combustion engine depreciates with use. It also has been generally assumed that a given filling of lubricating oil will depreciate beyond a useful condition in a much shorter time than required for its consumption or loss. From these and other considerations, pertinent to the economical use of oil and the cost of engine repairs, it follows first, that the oil should be replaced from time to time, and second, that there is an optimum condition to which the oil should be allowed to depreciate before it is discarded.

This proposition is apparently simple, but its practical application presents two serious problems. The first problem is to determine the optimum condition of depreciation at which the oil should be discarded. The second problem is to determine when a particular filling of oil has depreciated to that optimum condition. The present invention is concerned primarily with the second of these problems, namely, the testing of oils to determine their quality or degree of depreciation.

The present invention provides a new unit in terms of which the quality or state of depreciation of lubricants may be measured. It provides a new unit of measurement which is more reliable than any heretofore available to the public and which is more convenient than any heretofore known even in the laboratory.

The principal factors affecting the rate of depreciation of engine lubricating oils in service may be summarized briefly as follows:

1. The initial quality of the oil.
2. The type of motor.
3. The mechanical condition of the motor, that is, its state of repair.
4. The manner in which the car is driven, including speed and load conditions.
5. Climatic conditions.
6. The length of service of the oil, that is, the mileage driven or time operated since the last oil change.

Obviously, the initial quality of the oil will determine to a large extent the time rate of depreciation. Careful laboratory and engine tests have definitely proven the superiority of oils prepared from certain grades of crude and of oils refined by different processes. Similar tests have shown conclusively that the same oil in different makes and types of motors reaches an unsatisfactory condition for various periods of service which is undoubtedly due to variations in motor operating temperatures, mechanical design and the actual conditions of the individual motors.

Since the temperature of the various parts of the motor, such as cylinder walls, the underside of the piston heads, etc., all affect the rate of deterioration of the lubricating oil, the speed of operation, frequency of starting a cold motor, and carbureter adjustments all become important factors. Likewise, extremes in climatic temperatures and humidity may have a marked effect upon the amount of water and unburned fuel present in the oil. In addition, the speed of operation of the motor as well as motor temperatures are important factors governing the rate of consumption and also the rate of loss of oil from the motor.

At present the orthodox method used by the private automobile owner for determining when his used crank case oil should be changed is to follow the specification of the automobile manufacturer or the producer or vendor of the lubricating oil. This specification is made in terms of the safe mileage that may be obtained between oil changes. It is seemingly presumed by the public that the automobile manufacturer knows the safe mileage factor for his own cars for an oil of known quality. It is obvious, however, that the manufacturer has little or no control over the quality of oil that is used in the car or the conditions of its service. Obviously, then, his specification can be based only upon two of the six fundamental considerations mentioned above, namely, the type of motor and the length of service of the oil.

The producer of lubricating oil may also specify safe mileage between crank case changes but in this case he is appealing to owners of all makes of motor cars in various states of repair. His specification can take into consideration only the initial quality of the oil and the length of service.

At their best, the specifications of the motor manufacturer and the oil producer may attempt also to consider climatic conditions by specifying different grades of oil for summer and winter. But the seasonal difference is based more on considerations of viscosity than on rate of depreciation. It is undoubtedly true that mileage specifications of this type are based on statistical data but it is data of average performance and the specifications so determined can be considered only as specifications of average service, or perhaps an "average safe" guide to the user of the oil. It inevitably results from this system of service specification of oil that many users, perhaps most of them, will discard their oil before obtaining its full service while some may use it far beyond its useful life, thereby imposing excessive wear and often serious damage to their motors.

Large individual consumers of oil, such as operators of fleets of busses, trucks, airplanes and the like, or operators of stationary engines may be able to formulate a specification of oil service based upon considerations of cost of motor repairs. While this method of specification does tend to take into consideration most of the fundamental factors governing the rate of depreciation of the oil, it is necessarily based on experience and observations extending over considerable periods of time. But, since even this specification has been usually given in terms of miles or hours between oil changes it has never been very reliable, and has been valid only when the individual motor was used always for one type of service. Furthermore, it is subject to gross inaccuracies unless a fixed routine of inspection and repair of the motors, is rigorously followed.

In short, the user of lubricants, has available no adequate specification upon which he can rely in determining when he should change his oil. In fact these service specifications have been so wholly inadequate that the users sense that fact and in many instances elect to rely upon such crude tests and indexes as the "appearance" and "feel" of the oil in utter disregard of all specifications of motor manufacturers or oil producers. This lack of a satisfactory measure of oil deterioration has been emphasized by the lack of any convenient index available even in the laboratory for readily determining the condition of used oil. All determinations have been based on elaborate service tests and such indexes as have been available were valid only under rigorously controlled conditions.

For example, used oils heretofore have been carefully analyzed chemically to determine the respective concentrations and quantities of their several constituents. But such analyses have been of value only to the experienced lubrication engineer and chemist because there has been no known constituent that could be singled out as a reliable index of oil quality. All evaluations of oil quality even when based on elaborate chemical analyses necessarily have depended upon the judgment of the experienced technician.

Recently, however, it has been determined that certain substances known as asphaltenes are an important contributing cause of deterioration and failure of lubricating oils. As a result of this new and better understanding of oil deterioration, it has been determined that certain acid constituents of the oil also furnish a reliable index of its state of deterioration. However, acid measurements are difficult and expensive to make so that this index in spite of its reliability has remained a tool of the skilled laboratory technician and has not been available to the public and users of oil generally.

Any system of oil testing for use by motor operators and by the public should be simple and cheap and should provide individual measurements of considerable accuracy. For unless the cost of the test is very small as compared to the cost of a complete oil change the user of oil will prefer to follow arbitrary mileage specifications or be guided by the appearance and "feel" of the oil rather than sustain the cost of expensive tests, for he will feel that it is better to expend money for more fresh oil than to pay large sums for analyzing the used oil.

The present invention meets these requirements by providing a method and means for simply and easily determining oil quality. In accordance with the present invention we utilize the electrical conductivity of a lubricant as an index of its quality or state of depreciation. We further provide an improved method and apparatus for making such conductivity measurements in order that persons of no special technical skill may accurately, and at a low cost, determine the quality of a given sample of oil. The present invention, therefore, puts into the hands of the public and the users of oil a ready and convenient means of determining the state of depreciation of their lubricants. This serves to make the specialized information gained in the laboratory available to them for their own individual use. And those who wish to determine for themselves the economical life of the oil when used under their particular service conditions now have available a convenient and reliable index by which to evaluate the state of deterioration of any given sample.

The present invention permits oil specifications to be made in terms of a convenient and more reliable index and permits users of oil to easily, cheaply and accurately apply those specifications.

These and other objects and advantages will become apparent as the description proceeds.

Deterioration of lubricating oil is, according to recent laboratory findings, closely associated with the formation of sludge. In general, contamination by water, unburned fuel, carbon and inorganic solids such as sand, dirt, etcetera is by itself of very minor importance. The solid particles will collect in the sump where the oil is relatively stagnant. The water also will settle out to some extent. In many cases water and unburned fuel will evaporate and escape from the crank case during normal operation so that the amount present in the oil will be more or less limited although dependent to some extent on operating conditions of the engine.

But sludge is decidedly harmful. Sludge, in a broad sense, includes any deposits found in the engine as well as certain fluid-like materials in the oil. Sludge consists of a mixture of asphaltenes together with almost anything else that may be found in the crank case, including some of the lubricating oil itself. The asphaltenes apparently form a binder which holds solid particles in suspension so that they no longer settle to the bottom of the sump but flow with the oil. They take up carbon, water, fuel oil—almost anything that may be present and form the heterogeneous collection known as sludge. Sludge may appear as a gelatinous substance in the oil which carries the dirt with it when it circulates to the bearings and which clogs the screens, filters and ducts. It may appear as a hard coke-like deposit on the pistons and in the combustion chamber. And it may be a soft solid material having the consistency of putty.

The most serious consequence of sludge is the sticking of piston rings in their grooves. From this condition there follows over-heated pistons with consequent excessive wear and a tendency towards seizure and abrasion of the cylinder wall. In high power engines, which includes the aviation type, stuck rings are likely to induce piston failure or wreck the engine. Clogging in any part of the circulating system due to sludge will of course interfere with the proper distribution of the lubricant and serve to accentuate any local trouble such as stuck rings.

The asphaltenes, which are necessary to the formation of sludge are a product of the oil itself. They result from the oxidation of the hot oil in the presence of air. It is believed that this takes place principally at such hot spots as the under-sides of the piston heads. The sludge does not form at a uniform rate, but forms quite slowly when the oil is new and increases its rate of formation as the oil deteriorates.

It is known that the oxidation of the oil produces at least two products. One of these consists of certain acid compounds which by themselves are entirely harmless. The other consists either of asphaltene bearing compounds or asphaltenes themselves. If it is asphaltene-bearing compounds, then it is probable that the acid compounds react therewith to form asphaltenes.

Another possible explanation is that the oil oxidizes to form acid and that the acid then oxidizes to form asphaltenes. But regardless of the manner of their formation, the asphaltenes appear as solid particles in suspension in the oil and serve as nuclei for the formation of sludge. In some types of oil, the asphaltenes are precipitated appreciably only when the acid reaches a certain concentration. In other types the formation of asphaltenes and sludge is perceptible from the first but the rate of formation steadily increases with use. Both the rate of formation of sludge and the rate of its accumulation are to a large extent dependent upon the service conditions of the oil. For example, if the rate of consumption of oil is high as compared to the rate of formation of asphaltenes, the oil may be essentially non sludge-forming in that the addition of make up oil to the engine becomes a governing factor in preventing the concentration of asphaltenes from building up to objectionable values. It has been found that the concentration of the acid compounds in used oil is a reliable index of the tendency of the oil to precipitate the asphaltenes, and that these acid compounds reach a certain concentration before the asphaltenes precipitate and accumulate sludge in such quantities as to render the oil unfit for economical use.

Used crank case oil contains a large number of constituents some of which may be present in minute quantities. For the present purpose, these constituents may be classified as follows:

1. Oil
2. Acidic material
3. Water
4. Fuel ends
5. Inorganic solids
6. Asphaltenes
7. Blow-by carbon The oil is the lubricant itself. The acidic material, for the present purpose, may be defined as all oxidation products soluble in petroleum ether (also called hexane although it contains other petroleum compounds of similarly high volatility). These oxidation products are associated with the oil or are dissolved therein and may even constitute part of the lubricant. The oil together with these acidic oxidation products may be separated from the other constituents of the used oil by treating with petroleum ether. The oil and acidic materials dissolve while the other materials precipitate so that separation may be effected by filtering, after which the oil is recovered by boiling off the petroleum ether. The oil including its acid oxidation products when separated from the other constituents of the used lubricant is similar in appearance to new oil of the same grade. The concentration of acidic material is usually determined chemically by a standard-titration process for measuring the amount of some basic material such as potassium hydroxide with which the acidic material in the oil will react. It will be recognized, however, that this chemical determination does not necessarily measure the acid as above defined.

Fuel ends consist of unburned fuel of high boiling point which has seeped past the pistons. These constitute the diluents which serve to "thin-out" the lubricant. The presence of water and fuel ends depends somewhat upon ambient temperature and humidity as well as upon the frequency with which the engine is "started cold". Blow-by carbon consists of carbon that has blown by the pistons from the combustion chamber.

Asphaltenes may be defined as the material insoluble in petroleum ether but soluble in chloroform. These asphaltenes may be separated as follows: After treating the used lubricant with petroleum ether and filtering as above described, the residue is washed with chloroform and again filtered. The asphaltenes are then recovered from the chloroform filtrate. It is believed that if there are present in the used lubricant any asphaltene-bearing compounds from which the asphaltenes may be formed by simple reaction, they are included in the asphaltenes as here defined.

We have found that of all these constituents of a used oil, the acidic material as herein defined and the water are the only ones having an appreciable effect upon the conductivity of the used lubricant. We therefore remove the water before measuring the conductivity. Preferably we heat it to a temperature of about 250° Fahrenheit for a period of several minutes during which time the sample is stirred in order to prevent explosions as the water boils out. It is necessary to heat the oil above the boiling point of water in order to dry it and it is at the same time desirable to keep its temperature as low as possible in order to avoid oxidation of the oil during the drying process. A pair of electrodes are then introduced into the oil and the resistance of the electrical path through the oil is measured. A low resistance indicates a high conductivity and a worn oil. While a certain amount of water can be tolerated in engine lubricants, its presence in considerable quantities frequently indicates a faulty condition of the motor, such as, for example, a leaking water gasket. Accordingly the conductivity of the sample may also be measured before the removal of the water. Then by comparing the readings before and after drying, the quantity of water present in the oil may be determined. It has been found that comparatively small quantities of water which apparently have no appreciable effect upon the lubrication qualities of an oil may under certain conditions produce conductivities so great as to virtually overshadow the effect of the acidic materials in the oil.

In order better to acquaint those skilled in the art with the teachings and practice of the present invention certain embodiments thereof will now be described, reference being had to the accompanying drawings in which:

Figure 6 illustrates a modification of the system of Figure 3;

Figure 7 illustrates more or less diagrammatically still another system for measuring the conductivity of lubricants;

Figure 1:
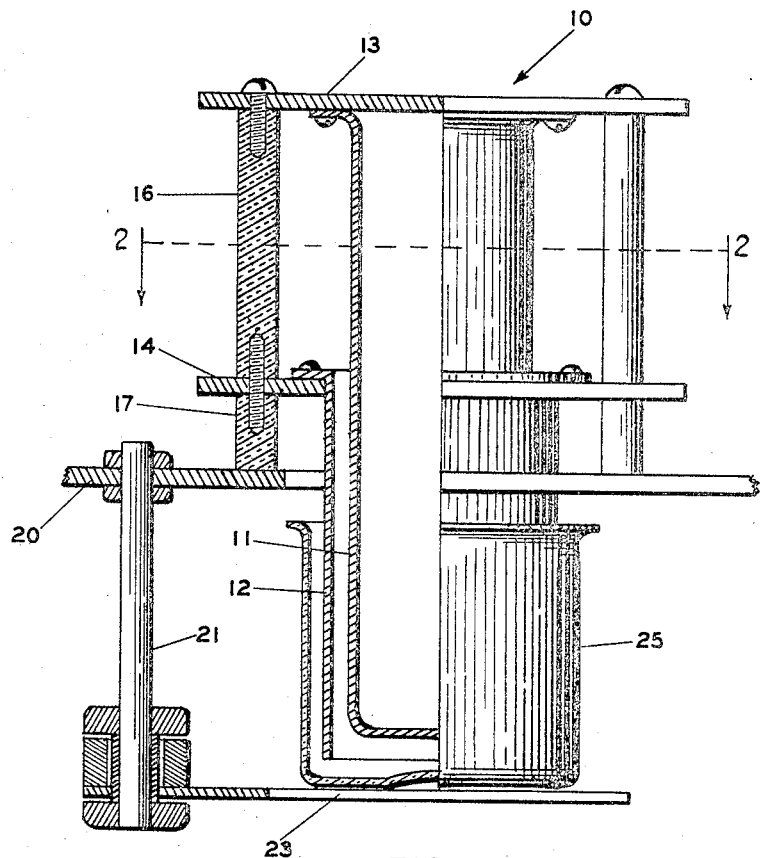
Figure 1 is an elevational view partly in section of a test cell for measuring the resistivity or conductivity of a sample of a lubricant.
Figure 2:
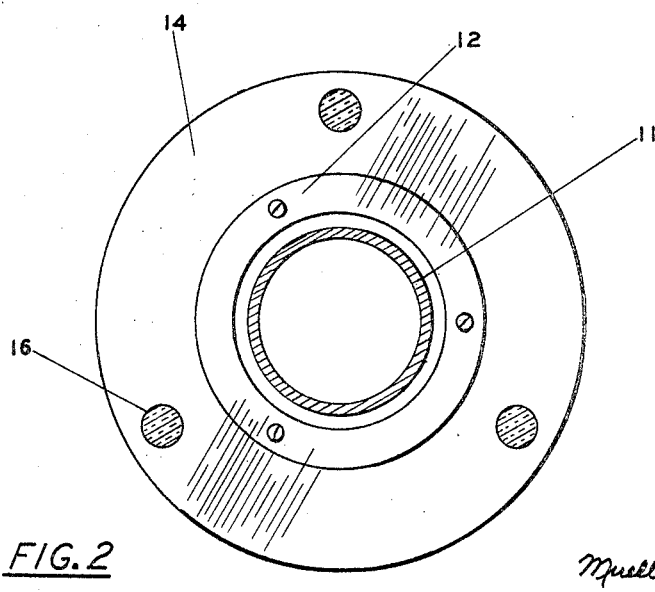
Figure 2 is a sectional view taken on the line 2—2 of Figure 1.

As is shown in Figures 1 and 2, the test cell which is designated generally by the reference numeral 10, comprises a pair of coaxial cylindrical electrodes 11 and 12 positioned with their axes vertical. The inner cylinder 11 is closed at its bottom and is supported at its top by a metal disk 13. The outer cylinder 12 is similarly supported on an annulus 14. The disk 13 and annulus 14 are separated by three insulators 16 of special construction. This assembly is supported by means of insulators 17 which are also of a special construction on a horizontal supporting surface or plate 20, the electrodes 11 and 12 extending below the same through a suitable aperture. A vertical shaft 21, rigidly secured to the plate 20, depends therefrom and carries a step 23 which is adapted to be rotated about the shaft 21 into position under the electrodes. A container 25 such as a glass jar or beaker is adapted to be partially filled with oil, raised into position about the cylindrical electrodes and there supported on the step 23. It is thus seen that the electrodes are rigidly maintained in fixed relation and the container 25 is solidly supported so as to maintain the electrodes immersed to a given depth in the oil. The resistance is measured between the two electrodes 11 and 12.

In a test cell having cylindrical electrodes about two inches in diameter with their adjacent walls separated an eighth inch and immersed between two and three inches, the resistance values of the oil between the electrodes may reach values of approximately 100,000 megohms ($10^{11}$ ohms) when measured at ordinary room temperatures. Since any leakage resistance of the insulators 16 is shunted across the resistance of the oil, it is apparent that these insulators must have an exceedingly high insulation value else they will introduce a serious error into the measurements. We have satisfactorily employed insulating rods of a porcelain-like ceramic material coated with ordinary paraffin. The ceramic material employed is marketed commercially under the trade name of "Isolantite". It has a high specific body resistivity and when clean has a high surface resistivity, but when exposed to the atmosphere its surface resistivity quickly falls to a relatively low value. Paraffin has both a high body resistivity and a high surface resistivity, but does not have sufficient mechanical rigidity at all ordinary temperatures to adequately support the electrodes in their proper relation. We accordingly prepare the insulators by thoroughly cleaning the ceramic pieces, heating them above the temperature of melted paraffin and applying molten paraffin. After cooling, the insulators are ready for use. When finished they have a perceptible paraffin coating. The leakage across insulators so constructed is negligible, and remains so for long periods of time.

Figure 3:
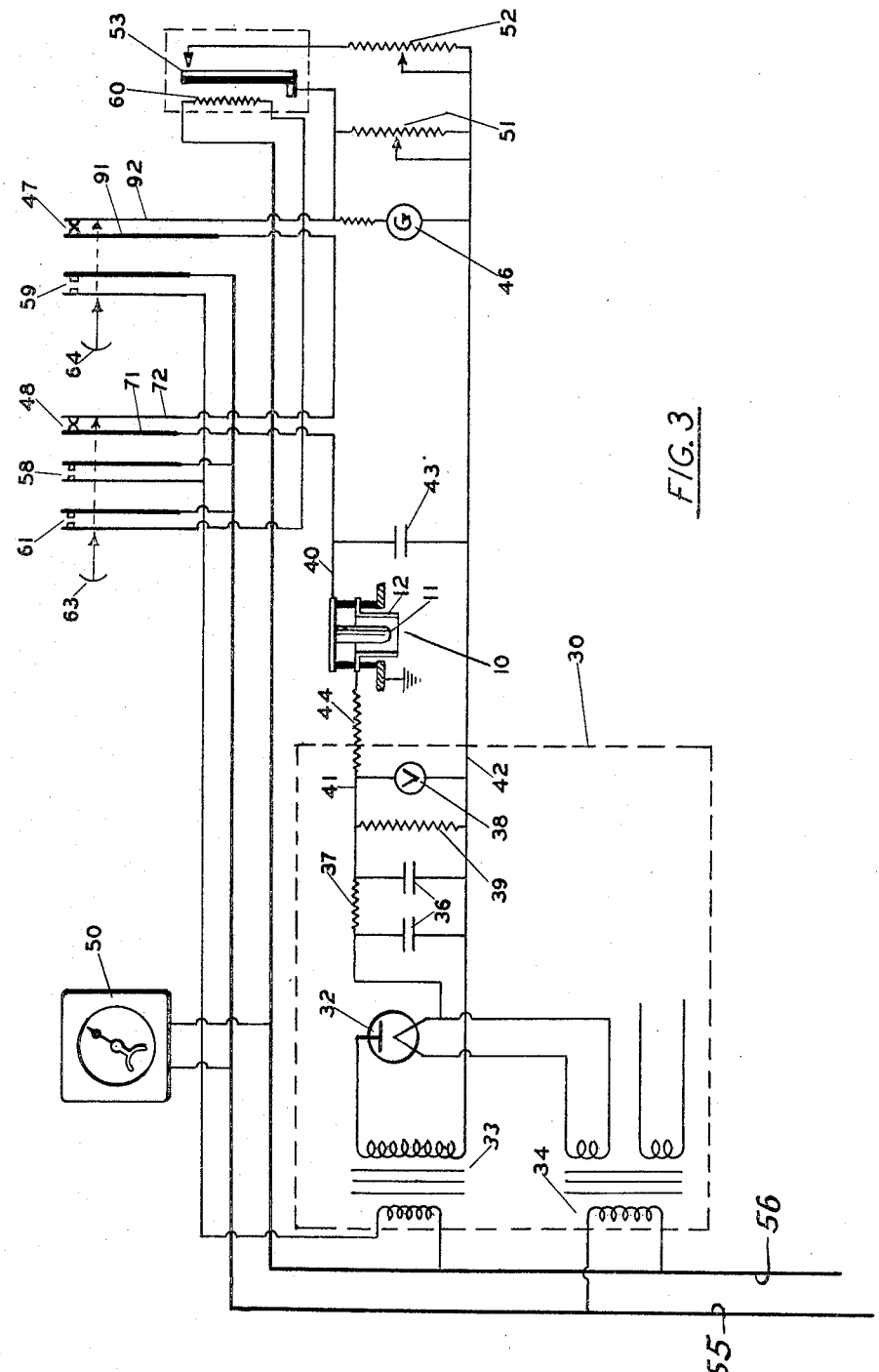
Figure 3 illustrates more or less diagrammatically a system in which the test cell of Figure 1 may be used in measuring the resistivity or conductivity of the lubricant.

In measuring the conductivity of the oil by means of this test cell, we may employ a circuit such as is shown in Figure 3. Therein, a power supply 30 consists of a thermionic rectifier 32 powered by a pair of transformers 33 and 34, the transformer 34 supplying the energy to heat the thermionic cathode of the rectifier and the transformer 33 supplying the power which is to be rectified and used for operating the test equipment. The output of the rectifier is passed through a filter network consisting of a pair of condensers 36 and a resistor 37. A voltmeter 38 and a bleeder resistor 39 are connected across the output terminals 41 and 42 of the power supply.

The measuring circuit consists of a condenser 43, the oil test cell 10 and a protective resistor 44 all connected in series, this series circuit being connected across the output terminals 41 and 42 of the power supply 30. A galvanometer 46 is connected through normally closed switch contacts 47 and 48 across the condenser 43. An adjustable regulating shunt 51 is permanently connected across the galvanometer and another resistor 52 is connected through normally closed contacts of a thermostatic switch 53 to also shunt the galvanometer.

The transformer 34 is permanently connected to the alternating current supply conductors 55 and 56 while the primary of the transformer 33 is connected to these same conductors through two pairs of normally open contacts 58 and 59. The contacts 58 and 59 are connected in parallel with each other so that either may be closed to energize the transformer 33. The thermostatic switch 53 is provided with a heater 60 which is connected to the alternating current conductors 55 and 56 through normally open contacts 61. The thermostatic switch 53 is a timing device which opens its contacts when its heater 60 is energized and holds them open for a considerable time after the heater is deenergized.

A synchronous electric clock 50, or other suitable time indicating device is connected to the alternating current conductors 55 and 56. The contacts 48, 58 and 61 constitute a manually operable switch assembly 63 illustrated more in detail in Figure 4. Likewise, the contacts 47 and 59 constitute another manually operable switch 64 which is illustrated more in detail in Figure 5.

It will be noted from Figure 3 that the transformer 33 is normally de-energized so that the voltage is zero across the terminals 41 and 42 of the rectifier and filter, and it will also be noted that the galvanometer 46 is normally connected across the condenser 43. This makes certain that the condenser 43 is normally discharged. In testing a sample of oil, the switch assembly 64 is first manually operated and held in the depressed position for a given length of time. This energizes the transformer 33 through the contacts 59 so as to apply voltage to the oil test cell 10 and the condenser 43, and at the same time opens the galvanometer circuit at the contacts 47 so as to permit the condenser to charge. The operator may refer to the continuously running clock 50 for accurately determining the proper time interval. After the required time has elapsed the switch 64 is released so as to close the contacts 47 and cause the condenser 43 to discharge through the galvanometer 46. The ballistic throw of the galvanometer is then observed, and taken as a measure of the quantity of electricity which has accumulated in the condenser 43.

When making the foregoing test, the shunt resistor 52 was connected across the galvanometer to reduce its sensitivity. If the throw of the galvanometer was such a small value as to indicate that it is desirable to make a more sensitive test, the manual switch 63 is then operated. This energizes the transformer 33 through the contacts 61 and opens the galvanometer circuit at the contacts 48. It also energizes the heater 60 of the thermostatic switch 53 through the contacts 58. The switch 63 is held in its operated position for the required length of time, during which time the thermostatic switch 53 opens its contact, thereby disconnecting the shunt 52 from the galvanometer 46. When at the end of the proper time interval the switch 63 is manually released, the contacts 48 are closed to connect the galvanometer across the condenser 43 and the ballistic throw of the galvanometer is again noted. This time, when the condenser discharges into the galvanometer the shunt 52 is disconnected and the galvanometer therefore exhibits a more sensitive response. After a time the thermostat 53 will cool and reclose its contacts to put the apparatus in readiness to repeat the tests.

The foregoing description shows one general method of making resistance measurements that may be employed in carrying out the present invention. We shall now describe certain specific features of the method and apparatus in greater detail.

The above described method of measuring the resistance of the oil cell involves permitting a current to flow through the resistor into the condenser 43 where it accumulates as an electric charge, said current being caused by a known voltage. The voltage applied across the electrodes 11 and 12 of the oil test cell is kept at a value too low to produce a spark through the oil. This insures that the measurement serves to determine the inherent specific conductivity of the lubricant. Since the current traversing the oil will be small and since an appreciable time interval will be involved in making the measurement it becomes apparent that leakage from the condenser 43 must be taken into account. Condensers can not conveniently be provided with a leakage resistance in excess of about four or five thousand megohms for one microfarad. In addition this leakage resistance is usually quite variable. In order to avoid the necessity of determining this leakage resistance prior to a resistance measurement and then the necessity of making a calculation to correct for it, we so adjust and proportion the circuit constants and the conditions of measurement as to make the measurement of oil conductivity substantially independent of variations in the leakage resistance of the condenser.

Assume that:
$E$ = Voltage at terminals 41 and 42
$R_p$ = Resistance of protective resistor 44
$R_o$ = Resistance of oil in the oil cell 10
$R_L$ = Leakage resistance across the insulators of the oil test cell
$R$ = Resistance between terminals 40 and 41. This is equal to $$R_p + \frac{R_L R_o}{R_L + R_o}$$

$C$ = Capacity of condenser 43
$R_c$ = Leakage resistance across terminals of the condenser 43
$Q$ = Condenser charge at time $t$. This is proportional to the ballistic throw of the galvanometer 46 and is determined therefrom
$t$ = Time during which condenser 43 charges Assuming that the galvanometer is disconnected by the opening of either of the contacts 47 or 48, and the voltage is applied to the terminals 41 and 42, the differential equation for the circuit is:

$$\frac{dQ}{dt} = \frac{E}{R} - \frac{Q}{C}\left[\frac{1}{R} + \frac{1}{R_c}\right] \quad (1)$$

Since $t$ equals zero when $Q$ equals zero, the equation may be expressed as a definite integral with limits assigned as follows:

$$t = \int_0^Q \frac{dQ}{\frac{E}{R} - \frac{Q}{C}\frac{R+R_c}{RR_c}} \quad (2)$$

Integrating the equation, the charge in the condenser is expressed as a function of the time during which the condenser has been permitted to charge:

$$Q = \frac{ECR_c}{R+R_c}\left[1 - e^{-t\frac{R+R_c}{CRR_c}}\right] \quad (3)$$

wherein the number $e$ is the base of the natural system of logarithms.

Now if the absolute value of the exponent of $e$ is very small as compared to unity, then the expression within the brackets is very nearly equal to that absolute value of the exponent. That is, if:

$$t\frac{R+R_c}{CRR_c} \ll 1 \quad (4)$$

then:

$$\left[1 - e^{-t\frac{R+R_c}{CRR_c}}\right] = t\frac{R+R_c}{CRR_c} \quad (5)$$

(to a close approximation) substituting this in Equation (3):

$$Q = \frac{Et}{R} \quad (6)$$

(to a close approximation)
so that:

$$R = \frac{Et}{Q} \quad (7)$$

(to a close approximation)

The present invention takes advantage of this relation to reduce the errors of the measurements. $R$ is the value to be measured. $E$ and $t$ can be determined with a high degree of accuracy. $R_c$, the leakage resistance of the condenser is usually a low value when compared to the values to be measured, and moreover, it is quite variable. In accordance with the present invention it is merely necessary to adjust the constants of the circuit and the conditions of operation to the proper value so as to make the actual value of the condenser resistance of negligible importance. This is done by satisfying the condition of Equation (4) so that the measured value of $R$ is independent of $R_c$ to a close approximation as given by Equation (7).

The extent to which variations in $R_c$ will introduce variations into the determination of $R$ may be evaluated approximately as follows: Taking the exact expression for $Q$ given by Equation (3), and differentiating with respect to $R_c$:

$$\frac{dQ}{dR_c} = \left[\frac{ECR}{(R+R_c)^2} + \frac{Et}{R_c(R+R_c)}\right]$$

$$\left[1 - e^{-t\frac{R+R_c}{CRR_c}}\right] - \frac{Et}{R_c(R+R_c)} \quad (8)$$

and applying the approximation of Equation (5):

$$\frac{dQ}{dR_c} = \frac{Et^2}{CRR_c^2} \quad (9)$$

(to a close approximation)

Setting up the expression for the ratio between the percentage error in Q to the percentage error in $R_c$ where the error in Q is due to that in $R_c$ and introducing the values given by Equations (6) and (9):

$$\frac{\frac{dQ}{Q}}{\frac{dR_c}{R_c}} = \frac{dQ}{dR_c}\frac{R_c}{Q} \quad (10)$$

$$= \frac{Et^2}{CRR_c^2}\frac{R_c R}{Et}$$

$$= \frac{t}{CR_c} \quad (11)$$

Typical values of the circuit constants etcetera are as follows:

$t = 60$ seconds
$R_c = 800$ megohms (minimum)
$C = 4.5$ microfarads
$R_p = 100$ megohms Since R, the resistance being measured, will always include $R_p$, the protective resistance, $R_p$ becomes the minimum value of R. Inserting these values in Equation (11):

$$\frac{t}{CR_c} = .016 \quad (12)$$

so that an error or variation, for example, of one percent in the value of $R_c$ would introduce an error of about one sixtieth of one percent (.016%) in the value of Q. From Equation (7) it is seen that the percentage error in R, the resistance to be measured, will be approximately equal to any error in E, t or Q. It is thus seen that a comparatively large variation in the value of $R_c$ can be tolerated without introducing a serious error into the resistance measurement.

While the value of the leakage resistance across the condenser 43 can vary considerably, it must remain high. That is, it must remain high in comparison with ordinary insulation resistance. As has been pointed out in the foregoing description, this leakage resistance will be low in comparison with the resistance to be measured. It will be noted from Figure 3 that the terminal 40 of the condenser 43 is connected at all times to one terminal of the test cell 10 and to one blade of the contacts 48. At times during operation it may be connected to a total of three blades of the contacts 47 and 48. Leakage can take place through the various members used to support these elements.

In order to minimize leakage at the test cell, we connect the center electrode 11, thereof to the condenser 43, the other electrode 12 being connected to the resistor 44. As will be noted from Figure 1, electrode 11 is supported by the special insulators 16. The condenser 43 is preferably mounted close to the test cell 10 so that the wire connecting the two may be supported solely by the electrode 11 of the cell 10 and the terminal 40 of the condenser 43. The blades of the contacts 47 and 48 are also supported on insulators of special construction and the actuating members are arranged to stay normally out of contact with the blades. In addition, the connecting wires are supported only by the switch blades and the terminal 40 of the condenser 43, themselves.

Figure 4:
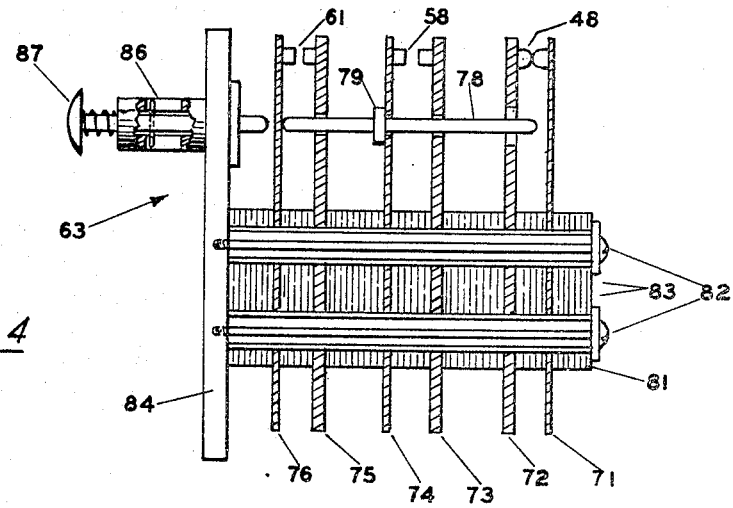
Figures 4 and 5 illustrate certain switches used in the system of Figure 3.

Referring to Figure 4 in which we have illustrated the switch assembly 63 in more detail, the contacts 48, 58, and 61 comprise the several spring blades 71 to 76 inclusive. Of these, the blades 72 to 75 inclusive are perforated to accommodate an insulating pin 78. The pin 78 is supported and carried by the blades 73 and 75 whose holes fit it quite closely. The hole in the blade 74 is large enough to provide clearance for easy mechanical operation. The hole in the blade 72 is much larger in diameter than the pin 78 in order to insure that the pin will never come in contact with it. The pin 78 is provided with a shoulder 79 which bears against the blade 74 so that the blade 74 and the blade 76, which bears against the left end of the pin, hold the pin snugly to cause it to move with them. The right end of the insulating pin 79 is normally held retracted from the blade 71 so as to avoid contact therewith.

The several spring blades are supported in a stack of special insulating laminations 81 which are clamped by a pair of screws 82 on a supporting plate 84. These screws are surrounded by insulating tubes 83, which fit snugly in perforations in the laminations and in the blades. The plate 84 carries a bushing 86 which in turn carries a push button 87. The push button 87 is made of insulating material and is normally held in a retracted position. It is adapted to be pressed against the spring blade 76. When the push button 87 is depressed it moves against the blade 76 to close the contacts 61 and through the agency of the pin 78 to close the contacts 58. At the same time the pin 78 moves against the blade 71 to open the contacts 48. When the push button is released the various parts return to their normal positions, the blade 74 bearing against the shoulder 79 to withdraw the pin 78 from contact with the blade 71.

Figure 5:
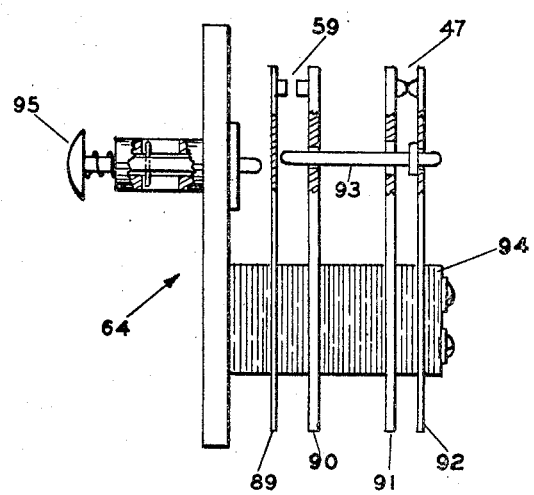

The switch 64 illustrated in Figure 5 is constructed similarly to switch 63. The switch 64 comprises the spring blades 89, 90, 91 and 92. The blades 90 and 92 carry an insulating pin 93 and the blade 91 is arranged to clear the pin 93 at all times. The blades are mounted in a stack of insulating laminations 94 in the same manner as are the blades of the switch 63, and the switch 64 is similarly provided with a push button 95. When the push button 95 is depressed, it moves the blade 89, which in turn and by means of the pin 93 pushes the blade 92. Thus the contacts 59 and 47 are operated together.

As has already been noted in connection with Figure 3, one or more of the blades of the contacts 47 and 48 may be connected to the condenser 43 while it is being charged and it is therefore necessary that those blades be well insulated from other parts of the circuit. To this end the laminated insulators 81 and the insulating tubes 83 of the switch assembly 63, and also the corresponding insulators of the switch 64, may be made of a commercial grade of condensation product such as "Bakelite" which has been impregnated with paraffin. While this insulation is not as good as the insulation used between the electrodes of the test cell 10, it provides an insulation which is comparable to the insulation between the plates and terminals of condenser 43 and is therefore entirely satisfactory. An inferior insulation may be used if it is considered advisable. Since the galvanometer circuit is opened at the contacts 48 for making the most sensitive tests, the contacts 48 are preferably connected next to the condenser 43 as shown, the switch blade 72 being the one connected to the condenser.

When making the less sensitive test, the galvanometer circuit is open at the contacts 47 of the switch 64. Both of the switch blades 71 and 72 of the contacts 48 as well as the spring blade 91 of the contacts 47 are then connected to the condenser 43, and leakage may take place from any and all of these blades to ground. However, the apparatus is so arranged that the only opportunity for such leakage is through the special high resistance insulators which support the switch blades. The blade 92 which is in contact with the pin 93 of the switch 64 is not connected to the condenser 43 and the pin 78 of the switch 63 is held away from both of the blades 71 and 72. When making the most sensitive test, the galvanometer circuit is opened at the contacts 48 so that the blade 72 is the only one connected to the condenser 43. During the charging of the condenser for this test, the blade 72 touches only its wax impregnated supporting insulators.

Referring again to Figure 3, it will be noted that the terminal 42 is connected to most of the apparatus of the circuit. In general it may be advisable to ground this terminal, but even if it is not grounded, the resistance therefrom to ground will probably always have a value very much less than 100 megohms, the value of the protective resistor 44. This resistance path will be through the insulating supports etc. of the apparatus to which the terminal 42 is connected.

Referring also to Figure 1, it will be recognized that any leakage across the insulators 17 of the test cell 10, to ground offers a path shunting the oil test cell and the condenser 43. If for example the leakage path between the electrode 12 of the test cell and the terminal 42 were 100 megohms and the protective resistor 44 were also 100 megohms, then the voltage across the test cell and condenser would be one-half of the voltage across the terminals 41 and 42, as measured by the voltmeter 38. For this reason the insulators 17 are also of a special high resistance type so that their leakage resistance will be large as compared to the resistance of the protective resistor 44. We have found that rods of a commercial grade of a condensation product which have been soaked in hot paraffin are satisfactory.

In Figure 6 we have illustrated an apparatus adapted to automatically measure the resistance of the oil. It operates through a cycle in response to a momentary operation of a push-button which sets it into operation. The measuring circuit proper is similar to that illustrated in Figure 3 and comprises a rectifier and filter circuit 102, an oil test cell 103, a condenser 104 and a galvanometer 105. The system also comprises a timer designated generally by the reference numeral 110 which comprises contact discs 111, 112 and 113 which are driven by any suitable means such as a synchronous clock motor 115. The timer is provided with a limit stop consisting of a notched disc 116 on the timer shaft cooperating with a normally engaged, magnetically operated catch or pawl 117.

A relay 120 controls the resistance measuring circuit. It is provided with normally closed contacts 121 which are connected in the galvanometer circuit and also with normally open contacts 122 which control the power to the rectifier. For purposes of illustration, the contacts 122 are shown detached from the rest of the relay 120. These contacts are actuated by the armature of the relay through insulating pins 123 and 124 carried thereon. The contacts of the relay 120 are constructed and insulated in a manner similar to the contacts 48 etc. of the switch 63.

The timer is adapted to be set into operation by the closing of a normally open push-button 119 which closes the circuit to the motor 115 and also to the magnet of the pawl 117, thereby releasing the pawl and setting the timer into operation. After the timer starts, it closes a holding circuit through the timing disc 111 which maintains the synchronous motor 115 and the magnet of the pawl 117 energized. Thereafter, the timing disc 112 closes the circuit to the magnet of the relay 120, causing the condenser 104 to receive current through the oil test cell 103. Thus, the operation of the relay 120 sets the resistance measurement apparatus into operation. The timer continues to run through a cycle of predetermined length and as it approaches the end of the time interval a circuit is closed through the contact disc 113 to a bell or other signal 125. This signal warns the operator that the cycle is almost completed and directs his attention to the galvanometer 105. Thereafter the circuit to the relay 120 opens at the contact disc 113 causing the relay to close its contact 121 and discharge the condenser 104 through the galvanometer 105. The operator then observes the ballistic throw of the galvanometer to determine the resistance of the oil. After opening the circuit to the relay 120, the timer next opens the circuit at the timer disc 111 so as to de-energize the motor 115 and the magnet of the pawl 117. The pawl then drops into the notch in the disc 116 to make certain that the timer stops.

By using an automatic timing arrangement in this manner, a greater accuracy of measurement may be obtained because it serves to minimize errors in the measurement of the time interval, and as may be seen from Equation (7) the time interval enters directly into the determination of the resistance.

Other means for measuring the charge of the condenser may be employed in place of the ballistic galvanometer. For example, an electrostatic voltmeter may be connected across the condenser 43 shown in Figure 3 and the quantity of electricity in the condenser determined from its terminal voltage as measured by the electrostatic voltmeter. An alternative procedure available when using an electrostatic voltmeter is the measurement of the time required to charge the condenser up to a predetermined potential. A gaseous glow discharge device such as a neon glow lamp may also be connected across the condenser 43. The time required for the condenser to charge to the ignition voltage of the lamp can then be measured. Also, the condenser 43 may be connected in the grid circuit of a grid controlled glow valve such as a "thyratron" or "grid glow tube". The charging of the condenser will be started simultaneously with the starting of an electric clock and when the voltage of the condenser reaches a predetermined value it will set the valve into operation which will in turn control a relay to stop the clock. The elapsed time as shown by the clock will then serve as a measure of the resistance of the oil.

However, we prefer to employ a ballistic galvanometer rather than use an electrostatic voltmeter or glow device since greater accuracy can be obtained in that manner. When using a galvanometer as shown in my Figures 3 and 6, the voltage to which the condenser 43 or 104 builds up can be kept very low, within the range of a few volts. An electrostatic voltmeter or a glow device requires a rather high voltage for its accurate operation and a high voltage across the condenser 43 is undesirable. The approximations of Equations (4) and (5) require that the voltage across the condenser 43 be low as compared to the voltage applied to the oil testing circuit. If the validity of this approximation is not maintained, the rather low and somewhat variable leakage resistance of the condenser 43 may not be neglected to the same extent as when the validity of this approximation is maintained. It is, therefore, apparent that if methods involving a comparatively high voltage across the condenser 43 are to be employed the leakage resistance across that condenser must be much more accurately known.

In Figure 7, we have illustrated diagrammatically still another system for carrying out our invention. We have found that the conductivity of used lubricants increases with temperature and that in the neighborhood of 250° Fahrenheit the conductivity is sufficiently high to permit its accurate measurement by a "direct deflection" method rather than a "ballistic" or "current accumulation method".

Power is supplied to the system of Figure 7 from an alternating current supply through conductors 141 and 142. Conductor 142 is grounded at the chassis of the apparatus. Since it is desirable that a chassis ground correspond to any external ground, a pilot light 143 is connected between conductor 142 and any convenient external ground connection. If the A. C. power line is grounded, the pilot 143 will light when the conductor 141 is connected to the ungrounded terminal thereof. A switch 144 may then be closed to supply power to the system through conductor 145. A pilot 146 then lights to indicate the "on" condition.

Figure 9:
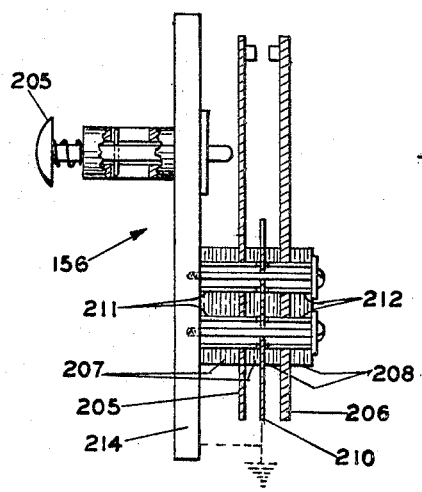
Figure 9 illustrates a special switch construction shown diagrammatically in Figure 7.

The alternating current is rectified for the measuring circuit by a valve 148 having an anode 149, cathode 150 and cathode heater 151. Across the output of the rectifier are connected a condenser 153 and a bleeder resistor 154. A voltage regulating valve 155 is also connected across the output of the rectifier. The connection thereof is made through a switch 156 of special construction which will be described more in detail in connection with Figure 9, and also through a regulating resistor 157. The measuring circuit is connected across the terminals of the valve 155 and comprises a protective resistor 160, an oil test cell 161, and a galvanometer 162, the latter being shunted by an adjustable resistor 163. The test cell 161 is similar in construction to the test cell 10 shown in Figures 1 and 2, and comprises an inner electrode 158 and an outer electrode 159.

The system of Figure 7 also includes auxiliary equipment for drying and heating the sample of lubricant that is to be tested. A relay 165 has its coil connected across the output of the rectifier through a normally open push-button switch 166. The push button 166 is shunted by contacts 167 of a timer 168. The timer 168 may comprise a synchronous motor or the like for driving a cam 169 which operates the contacts 167. Connected in parallel with the motor of the timer 168 is a motor 171 for driving a stirrer to be used in drying the lubricant. The relay 165 is provided with normally open contacts 172 for controlling the timer and stirring motors. The timer and stirrer are adapted to be set into operation by closing the push button switch 166. This energizes the relay 165 which in turn energizes the timer and stirring motors. When the timer starts, it closes its contacts 167 to maintain the relay 165 energized so that the manual push button switch 166 may be released. The timer runs through a predetermined cycle and then opens its contacts 167 to deenergize the relay 165 and stop the stirring operation. The timer stops with its contacts 167 open. The stirring and drying operation is thereby timed automatically to insure that sufficient time is allowed for removing all the water from any lubricant not having an excessive amount of water in it.

A container 175 for the sample of lubricant is provided with a resistance heater 176 connected through an external regulating resistor 178 to the A. C. conductor 145. Connected across the resistor 178 are the contacts of a regulating thermostat 179 contained in the container 175. A pilot lamp 180 is also connected across the resistor 178.

The thermostat 179 is normally closed so as to short circuit the resistor 178 and the lamp 180 and thereby impose full line voltage across the heater resistance 176. When the container comes up to the desired temperature the thermostat 179 opens its contacts to introduce the regulating resistance 178 in series with heater so as to reduce the power delivered thereto below the rate of heat dissipation from the container. This permits the thermostat to repeatedly open and close to so regulate the power to the heater 176 as to maintain it at the desired temperature. The lamp 180 being connected to the resistor 178 will flash in response to the operation of the thermostat to indicate that the container is at the proper temperature. The lubricant to be tested is placed in the container 175 for stirring and drying and is kept therein for making the conductivity measurements. The stirrer and the container are illustrated more in detail in Figure 8 where the container is shown in position under the stirrer.

Figure 8:
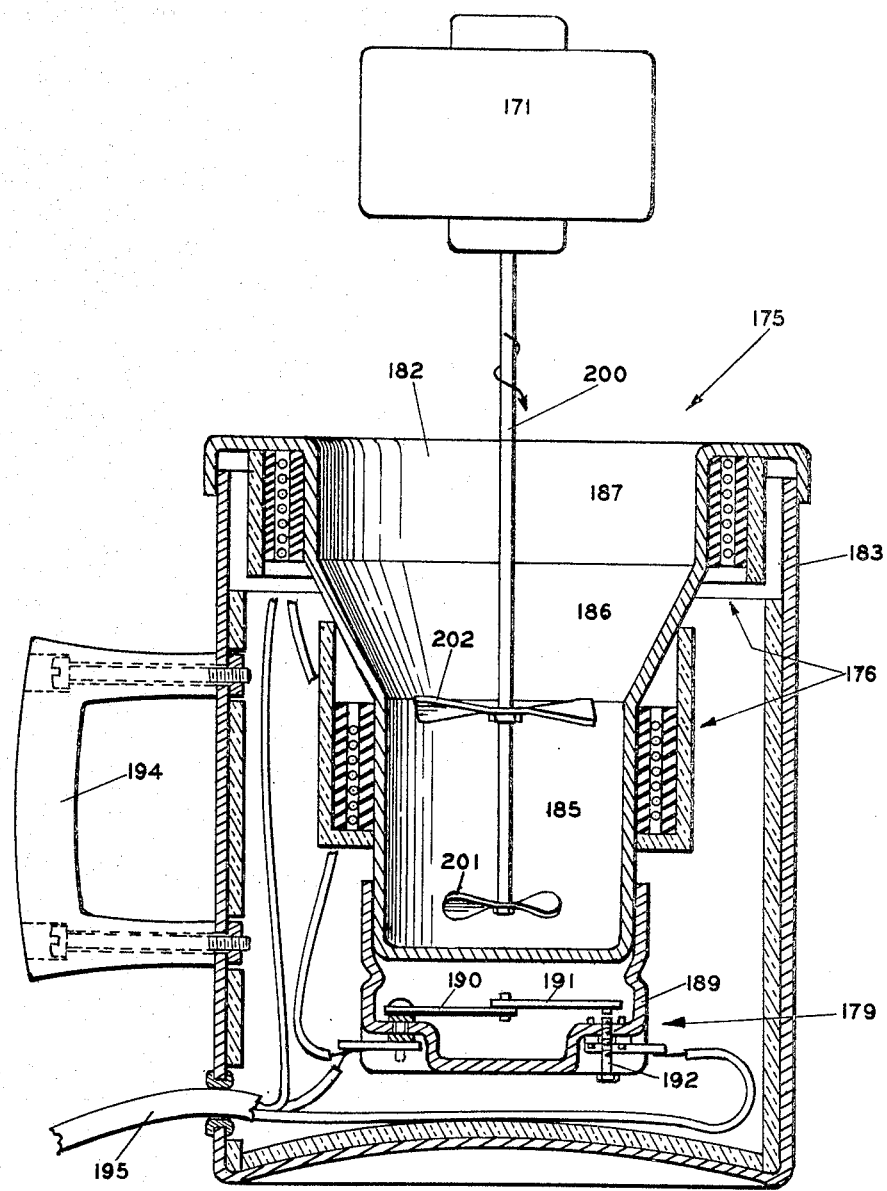
Figure 8 illustrates certain apparatus shown diagrammatically in Figure 7.

Referring to Figure 8, the container 175 includes an inner can 182 and an outer can 183, both of spun metal or the like. The inner can has a lower portion 185 of a diameter slightly greater than the outer electrode 159 of the test cell 161 (corresponding to the electrode 12 of the test cell 10 shown in Figures 1 and 2) so that the electrodes may be inserted in the oil to the required depth with a small amount of oil. The upper portions 186 and 187 of the inner can 182 are larger in diameter to facilitate stirring and drying. The inner can 182 is preferably constructed of heavy gauge copper to provide good head conductivity. The thermostat 179 is mounted within a spun copper cup 189 which telescopes onto the exterior of the lower portion 185 of the inner can. It comprises a bimetallic strip 190 having one end secured to, but insulated from, the cup 189. The free end of the bimetallic strip 190 carries a resilient extension 191 which in turn carries a contact adapted to engage a contact screw 192. The contact screw is also insulated from the cup 190. This construction avoids riveting or soldering the thermostat support to the can 182, while providing an intimate thermal connection. The heater element 176 conveniently may be wound on the cylindrical surfaces of the can 182 not required for the thermostat. The outer surface of the heating element is covered with a heavy layer of heat insulating material to reduce losses to the air so as to deliver as much of the heat as possible directly to the metal of the can. Since the can is made of heavy copper its thermal conductivity is high and its temperature will remain substantially constant throughout regardless of the fact that the heating element may be remote from the liquid to be heated.

The outer can 183 is lined with a layer of heat insulating material and is provided with a heat insulating handle. A connecting cable 195 carries the necessary conductors for connecting the heater element 176 and thermostat 179 into the circuit as shown in Figure 7.

The stirrer comprises a vertical shaft 200 carrying a number of stirring blades 201 and 202. The shaft 200 is supported and driven by the electric motor 171. The several stirring blades are shaped like propellers and are arranged to drive the liquid downward, the lower blade 200 being the smaller and the other blade being somewhat larger. In use, the lower portion 185 of the container is filled about ¼ or ⅓ full with the oil to be tested and the stirring motor 171 is started. At the start only the propeller 201 is immersed in the oil. The propeller 201 driving the center portion of the liquid downward and setting it into rotation causes the oil to spread out against the heated walls of the container. The liquid wells up on the sides and tends to pour back into the center. The propeller 202 catches this oil as it is poured back and whips it downward so as to prevent a curtain from forming. The propeller 202 also tends to circulate air over the surface of the body of oil. As the oil is heated and the moisture is driven therefrom, it begins to form a froth and this froth also has a tendency to close over the top and prevent air from circulating against the body of oil. The propeller 201 catches this froth and serves to whip the water vapor out of it and drive it downward into the body of the oil. Some of the froth will crowd into the enlarged upper portion of the container and will lie against the side walls thereof. Because the upper portion has a large diameter, the froth can not easily close over the top. Also the container is of such size as to accommodate the froth without permitting it to run over. If the upper portion of the wall were allowed to cool, the froth coming in contact therewith, would have its water vapor condensed and the water would be returned into the oil. By constructing the inner container 131 with heavy walls of copper or the like, the heat will be readily conducted to any cool portions of the wall so as to keep the container at a substantially even high temperature. When the moisture is entirely removed from the oil, frothing will cease. It is necessary to heat the oil above the boiling point of water for drying it quickly and it is at the same time desirable to keep its temperature low enough to avoid appreciable oxidation. Preferably, we maintain the container at a temperature of approximately 250° F. and heat and stir the oil for several minutes bringing it up to a temperature of approximately 250° F. Apparently, lubricating oils and the like oxidize to some slight extent in the presence of air even at temperatures near the boiling point of water. By heating the lubricant to a temperature above the boiling point of water, as for example, a temperature of 250° F. and stirring it violently as described, complete dehydration is accomplished within a few minutes. Any oxidation that takes place within this short space of time is inappreciable.

Since the oil will be hot after removing the moisture we may test it at the high temperature. The oil increases its conductivity with temperature so that the resistance values to be measured are much lower. This permits the use of the more simple "direct deflection" method of measurement accomplished by the circuit of Figure 7. A further advantage of measuring oils at a high temperature results from their decrease in viscosity, since they will flow into the test cell and drain therefrom more easily when thin. When measuring extremely heavy lubricants such as gear grease and the like it may be necessary and desirable to heat them to a much higher temperature in order to lower their viscosity.

After heating and drying the sample of lubricant in the container 175, the container is removed from the stirrer and placed under the test cell 161. The switch 156 is then closed to supply power to the measuring circuit, the voltage being regulated to a constant predetermined value by the valve 155. The current passed through the lubricant by this voltage is indicated directly by the galvanometer 162. Since the voltage supplied to the test circuit is constant, galvanometer 162 may be calibrated directly in resistivity or conductivity of the lubricant in the test cell.

The galvanometer 162 has a very low resistance when compared to insulation resistance. Consequently it is unnecessary to have a high resistance insulation between ground and the electrode connected to the galvanometer. Any insulation resistance that is high in comparison with the several thousand ohms of the galvanometer is sufficient. Accordingly, the galvanometer is connected to the outer electrode 159 which may be supported on the chassis by any suitable insulators as indicated in the diagram of Figure 7, the construction being similar to that of the test cell 10 shown in Figures 1 and 2. The central electrode 158 which may be supported on high grade insulators such as the insulators 16 of Figure 1, is connected to the protective resistor 160.

It is to be noted that the electrode 159 is likely to come into contact with the metal of the container 175 during measurements. Therefore, to prevent short circuiting the galvanometer, the stand for supporting the container 175 may be constructed of insulating material or other similar provision may be for insuring that the container will be insulated from the chassis during measurements.

It is desirable to prevent leakage of current through the switch 156 to the galvanometer when the switch 156 is in its open position. While this leakage could do no harm, it might cause a slight deflection of the galvanometer. This is undesirable in that it would prompt the operator to adjust the "zero setting" of the galvanometer to compensate for it thereby introducing an error into the measurements. Furthermore the deflection of the galvanometer due to the leakage would vary from time to time so that the operator would feel that "something is changing" in the apparatus and that therefore the measurements of oil conductivity are not reliable. Leakage currents may be reduced to an inappreciable value by employing insulators of sufficiently high quality, such as, for example, insulators made of a phenol condensate product and coated with paraffine. However, we prefer to employ a switch of special construction shown in Figure 9. Therein, the two blades 205 and 206 of the switch 156 are mounted in separate portions 207 and 208 of a stack of insulating laminations. A conducting guard blade 210 is mounted in the stack between the separate portions 207 and 208. The switch blades 205 and 206 and the insulating laminations are perforated to receive insulating tubes 211 and 212 which extend through each portion of the stack. These tubes do not extend through the guard blade 210 but rather butt thereagainst. Screws extend through the tubes and the guard blade 210 to clamp the whole stack to a supporting structure 214 which also carries an actuating button 215.

When connected into the system of Figure 7, the guard blade 210 and the support 214 are grounded as shown. This positively prevents any leakage from either of the blades 205 and 206 to the other because the resistance path through the insulating supports is interrupted by the guard blade 210 which by-passes it to ground. As a result, no leakage current can reach the galvanometer 162.

The present invention will find use by all users of lubricating oils and the like for determining when their lubricants should be discarded. It will find use in garages, service stations and the like—wherever lubricants are sold or engines or the like are serviced, inspected or repaired. It provides a new index of oil quality in terms of which useful specifications may be made and which may be easily and cheaply used in following such specifications. Measurements and tests in accordance with our invention may be easily and properly carried out by persons of no special technical skill and provides an indication which can be readily read and interpreted by the operator and even by the customer (in the case of service stations etc.) whose oil is being tested.

There is no adequate definition of a bad or worn oil. While it is true that certain characteristics are usually a sign of used oil they do not provide any precise measure of its use or its quality as a lubricant. It is not definitely known precisely what constitutents or characteristics that may be absent or present in a used oil render it bad. It is, of course, known at the present time that sludge is harmful. But it is not known what other constituents or conditions besides sludge may be just as harmful or what essential constituents may be lacking in a worn oil. It therefore follows that sludge accumulation alone does not define the oil's condition precisely for it entirely disregards any other possible contributing factors. But even if it were assumed that all contributing factors were known and the definition of worn oil were to take them all into account, any designation or specification of the extent of the useful life of the oil would involve complex economic considerations and would in the end be an approximation.

It is thus seen that the accuracy with which the useful life of the oil can be defined in terms of sludge is materially limited.

Any system which measures the sludge with an accuracy greater than the accuracy of the definition of worn oil, is just as accurate a measure of the oil as the sludge itself. That is, if the conductivity of the oil is a more accurate index of the sludge than the sludge is of the condition of the oil, then the conductivity is substantially as accurate an index of the oil condition as the sludge itself. These conditions are met by the present invention.

It is impractical to attempt to measure sludge itself because of its uncertain and heterogeneous composition. But, since the asphaltenes are a necessary constituent of the sludge and because sludge invariably forms when they are present, the asphaltenes are taken as a measure of the sludge.

The rate of sludge formation varies considerably with the type of crude that the oil is made from and also its method of refining. For example some types of Pennsylvania oils form sludge very slowly at first so that the oil remains in excellent condition for a long time. Finally, however, a point is reached at which sludge begins forming rapidly and the oil quickly depreciates to such a condition that it should be changed. In general, the other commercial lubricants form sludge more rapidly from the beginning and while the rate of formation does increase with the age of the oil, it never exhibits an abrupt change but rather depreciates slowly throughout its entire life.

As has already been pointed out, the acid content of a used oil serves as an index of the asphaltenes. The relation between acids and asphaltenes depends somewhat upon the particular type of oil under consideration so that the determination of asphaltenes by acid measurement may be even more accurate when the type of the oil is taken into account.

Acidic material in the oil may be quite accurately determined by conductivity measurements. While the relation between conductivity and acid concentration may depend to a slight extent on the particular acids present which in turn depends on the type of oil and its service conditions, the determination of acidity is extremely reliable even though all distinction between types of oil and service conditions, are disregarded. With the apparatus herein described, the resistance may be measured with a very small percentage of error.

Thus, generally speaking the measurements and evaluations to be made according to the present invention are as follows:

Reading of measuring instrument
Oil conductivity
Concentration of acid materials
Concentration of asphaltenes
The amount of sludge
The quality of the oil In this list, each quantity or evaluation is determined from the one preceding it and it serves to determine the one following it. Thus we take the reading of the instrument as an indication of the conductivity of the oil, to determine its acidity, to determine its concentration of asphaltenes, to determine its tendency to sludge, to evaluate its quality as a motor lubricant. The last quantity is the only one we are really interested in. But as has been pointed out, this quantity is not capable of exact evaluation for it involves a number of exceedingly variable economic considerations which are themselves difficult to evaluate. The formation of sludge is also difficult to evaluate but it is as good an index of the oil's quality as is now known.

Since sludge is known to be caused by the precipitation of asphaltenes, the determination of sludge from asphaltenes is undoubtedly more accurate then the determination of oil quality from sludge. Similarly the asphaltenes may be determined from the acidic material, and the acidic material from the conductivity with accuracies greater than the accuracy of determining oil quality from sludge. The measurement of conductivity is even more accurate than the other determinations. It is thus seen that all the steps in the process of evaluation are more accurate than the definition of the oil quality. Consequently conductivity measurements when carried out in the manner described herein, provide an index of oil quality substantially as accurate as one that would result from a precise determination of either the acid, the asphaltenes or the sludge.

We have found that the measurement of conductivity is intrinsically more accurate than a chemical determination of acidity. Thus on a number of samples of oil which were oxidized by a laboratory method approximating engine service, it was found that when conductivity was plotted against time of oxidation, a smooth curve was obtained. But acid (determined by titration) when plotted against time of oxidation gave an irregular curve. In fact the points were not even in regular order. However, this irregularity can be attributed to the inherent inaccuracy of the chemical method of acid determination.

A further advantage of the present invention lies in the high accuracy of its measurement of conductivity. As a result of this high accuracy, measurements can be duplicated. This characteristic causes it to win the confidence of those who use it. It will be apparent that the present invention may be used by persons having no understanding or appreciation of its technical principles or limitations. Such persons will not appreciate the concept of "probable error" of measurement and will be inclined to discredit any method that shows the error in its readings. In the present invention the conductivity measurements are exceedingly accurate so that the "probable error" does not appear in the readings of the instrument. As a result it is concealed from those who do not understand its significance and who would mistrust the measurement because of it.

The present invention provides a method of evaluating oil quality which is simple, easy and convenient so that it can be properly carried out by unskilled persons as well as by laboratory technicians. It further provides a method of accurately testing oil at low cost so that it now becomes feasible for operators to actually test the oil in individual motors at frequent enough intervals to make it worth while.

Tests and experiments have evolved the tentative rule that generally speaking, an engine lubricating oil should be changed when its specific conductivity is of the order of 30 micro-micromhos ($30 \times 10^{-12}$ mhos) per centimeter-cube at a temperature of 250 degrees centigrade. This corresponds to a resistance of about 100 megohms when using a test cell about two inches in diameter and two and one half inches deep with a gap of one-eighth inch between the electrodes. This recommendation is general in that it is intended to be followed without regard to the type of oils used or the specific conditions of service. It serves to reject oils of the Pennsylvania crude before asphaltenes begin to precipitate rapidly, and it serves to reject other types of oils while the asphaltenes are still at a value which may be considered safe.

Thus where an oil tester is used in an automobile service station and oil of all types and from motors of all makes and conditions of repair are to be tested this is a safe guide to follow in making recommendations. No doubt, further experience with the invention may indicate that some other value of conductivity more accurately marks the limit of economical use for oil. Likewise further experience will undoubtedly teach that different conductivities mark the limit of useful life of oils made from different crudes or oils subjected to different service conditions.

In this respect operators of large fleets of motor vehicles or the like are in a position to quite accurately determine the conductivity at which the oil becomes uneconomical to use under their particular service conditions. Such users have heretofore attempted to economically determine the useful life of oil in terms of miles or hours of service using repair costs and the like as a basis of evaluation. As has been previously pointed out, recommendations in miles or hours of service is undependable. But the present invention provides an accurate and reliable measure of an important causative agency of deterioration, namely, asphaltenes and sludge, so that now, the user of oil has a more accurate measure of the condition of his oil and is better able to determine at what condition it reaches the end of its economically useful life.

The present invention provides a new unit by which to measure the quality or "life" of lubricants. It measures the oil not in terms of miles or hours of service, not in terms of color or viscosity, but in terms of electrical conductivity. This new unit may be used by the expert and layman alike for testing lubricants and evaluating their qualities whether the exact quality at which the lubricant becomes "bad" is known or not. Just as miles of travel and time of service are now used as indexes of the condition of oil, conductivity of lubricants may be employed as an index of oil condition. An evaluation in terms of conductivity is infinitely more meaningful than any evaluation in terms of miles, hours or the like. An evaluation in terms of conductivity is of value even though the user has only the vaguest notion of the optimum condition to which he should permit the oil to deteriorate in order to realize its optimum economic life. Obviously, the present invention provides a true index of the "worn" condition of the lubricant whether or not it is known what condition of "wear" marks the point at which the lubricant should be replaced in order to realize the maximum economy of engine operation. When that optimum condition of "wear" or depreciation has been determined which marks the full economic use of the lubricant, the user of a lubricant by measuring its conductivity determines not only its state of depreciation but he learns also how nearly he has approached the optimum condition. The evaluation of the optimum condition will necessarily be evolved from the experience of the users of lubricants and from the results of specialized laboratory tests.

While economy has been cited herein as the criteria of optimum conditions of operation of motors and the like, it is apparent that the optimum condition may be determined entirely on the basis of other considerations. Thus for example in most instances economy would be a consideration secondary to the possibility of a forced shut down.

The present invention is by no means limited to the testing of engine lubricants. Engine lubricants is merely one of the more important of its applications. It may also be used for measuring the state of deterioration of other lubricants, as for example other petroleum products such as gear lubricants and the like. These lubricants are also subject to deterioration due to use and likewise oxidize when heated to form products having a conductivity differing from that of the unused lubricant.

In order to afford those skilled in the art, the fullest understanding of the present invention and to enable them to practice the same, we have described and analyzed the same in the light of present knowledge. However, aside from and independent of any reference to current knowledge or theory, the present invention provides a new and useful index of "wear" or deterioration of lubricants. Lubricants increase in conductivity with use and used lubricants exhibit higher conductivities than new lubricants.

The illustrative character of the foregoing description will be readily apparent and we, therefore, do not wish to be limited except by the scope of the appended claims.

We claim:

1. In an apparatus of the class described, a test cell comprising a pair of electrodes adapted to be immersed in a body of oil or the like, a condenser, a power supply, a ballistic galvanometer and a switch, said test cell, condenser and power supply being connected in series, said ballistic galvanometer being connected across said condenser through said switch.

2. In an apparatus of the class described, a test cell comprising a pair of electrodes, a condenser, a power supply for charging said condenser through said test cell, and means for measuring the charged condition of said condenser.

3. In a system of the class described, a test cell having a pair of electrodes adapted to be immersed in oil or the like, a power supply, a current measuring device, a switch, and a conducting guard interposed in the leakage path between the terminals of said switch, said power supply, switch, test cell and current measuring device being connected in series, said guard being connected to said circuit at a point which is on the opposite side of said power supply and said current measuring device from said switch.

4. In an apparatus of the class described, a pair of electrodes adapted to be immersed in oil or the like, and means supporting one of said electrodes including an insulator comprising a ceramic material having a high body resistivity coated with paraffin.

5. In an apparatus of the class described, a test cell comprising a pair of electrodes adapted to be immersed in a body of oil or the like, a condenser, a power supply, a ballistic galvanometer and control means for automatically connecting said power supply, said test cell and said condenser in series for a predetermined period and then connecting said galvanometer across said condenser.

6. A method of determining the state of deterioration of a lubricating oil which comprises preliminarily removing the moisture from said oil, measuring the electrical conductivity of said moisture free oil, and then comparing the reading obtained with a standard whereby the state of deterioration of the oil is made known.

7. A method of determining the state of deterioration of a petroleum lubricant which comprises heating it above the temperature of boiling water to effect substantial removal of moisture from said lubricant, measuring the electrical conductivity thereof and comparing the reading obtained with a standard whereby the state of deterioration of the lubricant is made known.

8. A method of determining the state of deterioration of an engine lubricant which comprises bringing it to a predetermined temperature to effect substantial removal of moisture therefrom, measuring the electrical conductivity thereof and comparing the reading obtained with a standard whereby the state of deterioration of said lubricant is made known.

9. A method of determining the state of deterioration of a lubricating oil which comprises heating it to an elevated temperature to effect substantial removal of moisture therefrom, stirring it, measuring the electrical conductivity thereof and comparing the reading obtained with a standard whereby the state of deterioration of the oil is made known.

10. A method of determining the state of deterioration of a lubricating oil which comprises heating it to a temperature above the temperature of boiling water but below temperatures at which it oxidizes rapidly in air whereby substantial removal of moisture from the lubricant is effected, measuring the electrical conductivity of the thus treated lubricant and comparing the reading obtained with a standard whereby the state of deterioration of the oil is made known.

11. The method of measuring a high resistance with a minimum of error which consists in causing an electric current to flow therethrough into a condenser, measuring the voltage drop across said high resistance, the accumulated condenser charge and the time of flow, and proportioning the condenser capacity and time of flow with the resistance to be measured as regards the relative magnitudes thereof whereby the voltage to which the condenser builds up is low compared to the voltage drop across the resistance to be measured.

12. The method of measuring the conductivity of a lubricant having a high specific resistance for the purpose of determining with a minimum of error the lubricating properties thereof which consists in establishing a power supply having a substantially constant potential, causing an electric current to flow through a sample of said lubricant to charge a condenser, making the time of said flow short compared to the time constant of the circuit, measuring the time of flow and the accumulated condenser charge, and comparing the readings obtained with a standard whereby said lubricating property is made known.

13. The method of measuring a high resistance by permitting a current to flow therethrough to charge a condenser and minimizing errors due to variation and fluctuations of the unavoidable leakage resistance across the condenser which consists in establishing a power supply of known characteristics, passing an electric current therefrom through said high resistance to charge the condenser, proportioning the time of flow, the condenser capacity, the leakage resistance and the resistance to be measured as regards the magnitudes thereof so that the sum of the resistance to be measured and the leakage resistance is small compared to the product of the condenser capacity, the resistance to be measured, the leakage resistance and the reciprocal of the time of flow, and evaluating said resistance to be measured from the known characteristics of said power supply, the time of flow and the accumulated charge of the condenser.

14. A method of determining the state of deterioration of a lubricating oil which comprises subjecting a sample thereof to a predetermined voltage gradient less than that required to produce a spark, measuring the density of electric current produced by said voltage gradient and comparing the reading obtained with a standard whereby the state of deterioration of the oil is made known.

15. A method of determining the state of chemical deterioration of a lubricating oil which comprises placing a sample thereof between a pair of electrodes, impressing a voltage across the electrodes which is less than the voltage required to produce a spark in the oil between said electrodes, measuring the current between said electrodes, determining the value of the voltage impressed across the electrodes, determining the dimensions of the current path through said oil between the electrodes, comparing the readings obtained with standards whereby the state of chemical deterioration of the oil is made known.

ARCHIE J. McMASTER.
ANDREW CHRISTY.